US012531227B2

(12) United States Patent
Hughes et al.

(10) Patent No.: US 12,531,227 B2
(45) Date of Patent: Jan. 20, 2026

(54) COMPACT VACUUM PACKAGING TECHNOLOGY USABLE WITH ION TRAPS

(71) Applicant: ColdQuanta, Inc., Boulder, CO (US)

(72) Inventors: Steven Michael Hughes, Louisville, CO (US); Clinton Cahall, Lafayette, CO (US); Steffen Michael Kross, Boulder, CO (US); James S. Hale, Longmont, CO (US); Hugo Leon, Longmont, CO (US); Matthew Barton Jaskot, Golden, CO (US)

(73) Assignee: ColdQuanta, Inc., Boulder, CO (US)

( * ) Notice: Subject to any disclaimer, the term of this patent is extended or adjusted under 35 U.S.C. 154(b) by 441 days.

(21) Appl. No.: 18/122,032

(22) Filed: Mar. 15, 2023

(65) Prior Publication Data

US 2023/0298880 A1 Sep. 21, 2023

Related U.S. Application Data

(60) Provisional application No. 63/320,983, filed on Mar. 17, 2022, provisional application No. 63/320,189, filed on Mar. 15, 2022.

(51) Int. Cl.
*H01J 49/24* (2006.01)
*H01J 49/42* (2006.01)

(52) U.S. Cl.
CPC .......... *H01J 49/24* (2013.01); *H01J 49/4205* (2013.01)

(58) Field of Classification Search
CPC ........... H01J 49/24; H01J 49/4205; H01J 7/18
See application file for complete search history.

(56) References Cited

U.S. PATENT DOCUMENTS

| | | | | |
|---|---|---|---|---|
| 2,778,485 | A * | 1/1957 | Gabbrielli | H01J 7/186 428/457 |
| 7,126,112 | B2 | 10/2006 | Anderson | |
| 2012/0258022 | A1 | 10/2012 | Hughes | |
| 2013/0187541 | A1 | 7/2013 | Urakawa | |
| 2018/0233337 | A1 | 8/2018 | Hughes | |
| 2019/0198306 | A1 | 6/2019 | Hosaka | |
| 2020/0343081 | A1 | 10/2020 | Mcbride | |
| 2021/0098246 | A1 | 4/2021 | Mccauley | |
| 2023/0169385 | A1 | 6/2023 | Meinert et al. | |

OTHER PUBLICATIONS

Kazuhiko Mase, Masato Tanaka, Naoya Ida, Hiraku Kodama, Takashi Kikuchi; Development of low-cost, high-performance non-evaporable getter (NEG) pumps. AIP Conf. Proc. Jul. 27, 2016; 1741 (1): 030015. https://doi.org/10.1063/1.4952838 (Year: 2016).*

(Continued)

*Primary Examiner* — Wyatt A Stoffa
*Assistant Examiner* — Christopher J Gassen
(74) *Attorney, Agent, or Firm* — Young Basile Hanlon & MacFarlane, P.C.

(57) ABSTRACT

A vacuum system is described. The vacuum system includes a vacuum cell and an ion trap. The vacuum cell includes walls having an inner surface that form at least a portion of a vacuum chamber. At least a portion of the inner surface has a topography including structures therein. The structures include a getter material. The ion trap is within the vacuum chamber.

18 Claims, 7 Drawing Sheets

(56) References Cited

OTHER PUBLICATIONS

Hiraku Kodama, Shinya Ohno, Masatoshi Tanaka, Masato Tanaka, Koji K. Okudaira, Kazuhiko Mase, Takashi Kikuchi; Low-cost, high-performance nonevaporable getter pumps using nonevaporable getter pills. J. Vac. Sci. Technol. A Sep. 1, 2016; 34 (5): 051601. https://doi.org/10.1116/1.4961050 (Year: 2016).*

Fang, Z. Z., Paramore, J. D., Sun, P., Chandran, K. S., Zhang, Y., Xia, Y., Cao, F., Koopman, M., & Free, M. (2017). Powder metallurgy of titanium—past, present, and future. International Materials Reviews, 63(7), 407-459. https://doi.org/10.1080/09506608.2017.1366003 (Year: 2017).*

H. Londer, G. R. Myneni, P. Adderley, G. Bartlok, J. Setina, W. Knapp, D. Schleussner; New High Capacity Getter for Vacuum-Insulated Mobile Liquid Hydrogen Storage Systems. AIP Conf. Proc. May 24, 2006; 837 (1): 210-220. https://doi.org/10.1063/1.2213076 (Year: 2006).*

Chuntonov, K. , Setina, J. and Douglass, G. (2015) The Newest Getter Technologies: Materials, Processes, Equipment. Journal of Materials Science and Chemical Engineering, 3, 57-67. doi: 10.4236/msce.2015.39008. (Year: 2015).*

* cited by examiner

COMPACT VACUUM PACKAGING TECHNOLOGY USABLE WITH ION TRAPS

CROSS REFERENCE TO OTHER APPLICATIONS

This application claims priority to U.S. Provisional Patent Application No. 63/320,189 entitled ION TRAP VACUUM PACKAGING TECHNOLOGY filed Mar. 15, 2022, and U.S. Provisional Patent Application No. 63/320,983 entitled DISCRETE VACUUM PUMP FOR COMPACT VACUUM CELLS filed Mar. 17, 2022, both of which are incorporated herein by reference for all purposes.

BACKGROUND OF THE INVENTION

Vacuum cells may be capable of achieving a high vacuum (HV) or an ultra-high vacuum (UHV), e.g. pressures of $10^{-9}$ Torr or less, within interior vacuum chambers. These HV and UHV vacuum chambers may be utilized in a number of applications, such as applications involving atomic vapor, cold or hot atoms, and/or trapped ions. For example, such vacuum cells may be used in quantum computing, basic research, sensors, atomic clocks, and other ion or atom technologies.

Although such vacuum cells are useful, improvements are desired. For example, there is a drive toward more compact vacuum cells. Some current vacuum cells capable of maintaining a high vacuum and usable with ion traps or cold atoms have lengths on the order of six inches or larger. Current technologies may not provide smaller workable vacuum cells for a variety of reasons. Technologies used in achieving UHV, such as ion pumps, may also become unstable and/or unusable at smaller sizes due to fundamental physics limitations. Smaller vacuum cells may have issues with sealing and maintaining a vacuum. For example, optical access may be desired for the interior of such vacuum cells. Providing a sufficiently sealed viewport in such a small form factor may be problematic. Consequently, techniques for addressing challenges to fabricating and utilizing compact UHV vacuum cells are desired.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured. In addition, although described in the context of single elements (e.g. a single vacuum chamber and/or a single viewport), multiple elements may be present (e.g. multiple vacuum chambers that may or may not be connected and/or multiple viewports).

A vacuum system is described. The vacuum system includes a vacuum cell and an ion trap. The vacuum cell includes walls having an inner surface that form at least a portion of a vacuum chamber. At least a portion of the inner surface has a topography including structures therein. The structures include a getter material. The ion trap is within the vacuum chamber. In some embodiments, the vacuum cell has a maximum dimension of not more than four inches and is configured to achieve a vacuum of less than $10^{-9}$ Torr. In some embodiments, the vacuum cell has a maximum dimension of not more than three inches. In some embodiments, the vacuum cell is configured to achieve a vacuum of less than $10^{-10}$ Torr.

Figure 1A:
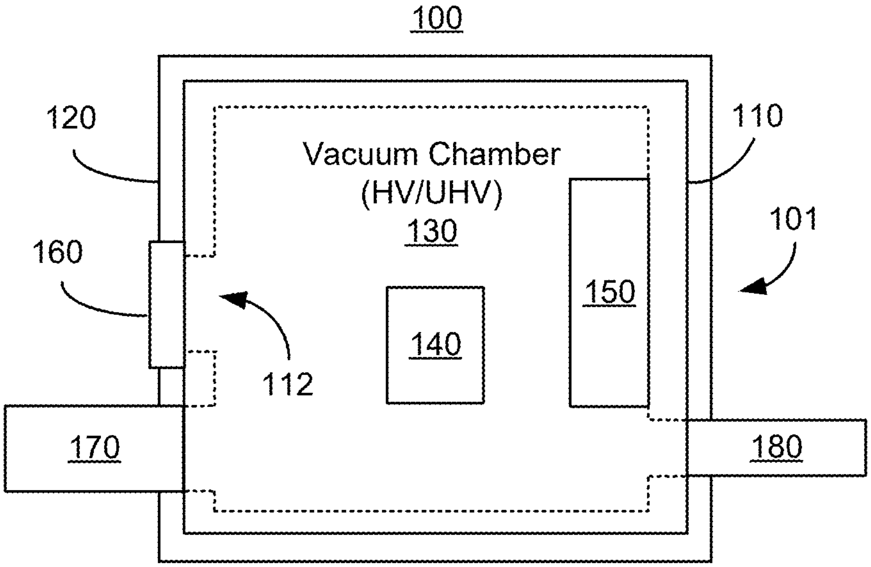
FIG. 1A-1B depict an embodiment of a compact vacuum system usable with ion traps.
Figure 1B:
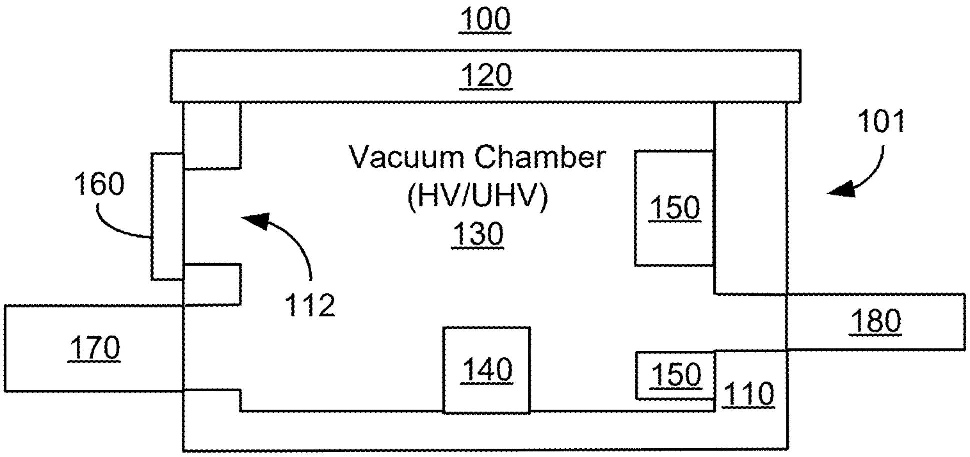

FIG. 1A-1B depict an embodiment of a compact vacuum system 100 usable with ion traps. Vacuum system 100 includes a vacuum cell 101 having walls 110 and 120 forming vacuum chamber 130 therein. Vacuum cell 101 includes viewport 160 affixed to aperture 112 in wall 110. Vacuum cell 101 may be compact. For example, in some embodiments, the dimensions of vacuum cell 101 do not exceed five inches. In some embodiments, the dimensions of vacuum cell 101 do not exceed four inches. In some embodiments, the dimensions of vacuum cell 101 do not exceed three inches. In some embodiments the volume of vacuum chamber 130 does not exceed five cubic centimeters. In some embodiments, vacuum chamber 130 has a volume not exceeding four cubic centimeters. Vacuum chamber 130 may be a high vacuum (HV), ultra-high vacuum (UHV), or lower pressure (e.g. XHV) chamber. For example, vacuum chamber 130 may be capable of reaching (i.e. achieving an initial vacuum of) and maintaining pressures on the order of not more than $10^{-3}$ Torr, or less (e.g. not more than $10^{-9}$ Torr, not more than $10^{-10}$ Torr, or not more than $10^{-11}$ Torr) for long periods of time (e.g. hours, days, weeks, and/or months). In the embodiment shown, vacuum chamber 130 is hermetically sealed. Thus, the HV or UHV pressure in vacuum chamber 130 may be obtained during fabrication and maintained during use of vacuum cell 101. In some embodiments, walls 110 and/or 120 are formed of Ti.

Vacuum system 100 also includes component 140, passive pumping components 150, viewport 160, ion pump 170, and pinch off tube 180. Although components 150, 160, 170, and 180 are shown, in some embodiments, one or more of components 150, 160, 170, and/or 180 may be omitted. Component 140 may be used to perform various functions within vacuum chamber 130. For example, component 140 may be or include an ion trap, neutral-atom trap, photonic assembly, an ion source, or other apparatus attached to vacuum cell 101 (e.g. during fabrication). Further, component 140 may require assembly and/or fabrication. Although one component 140 is shown, in some embodiments, another number of components 140 and/or portions thereof may be present. Thus, in some embodiments, component 140 is an ion trap.

Passive pumping component(s) 150 may be coupled to or formed from the walls of vacuum cell 101. For example, passive pumping components may include structures formed from getter material (e.g. Ti) of which some or all of walls 110 and/or 120 may be formed, getters formed from pieces of material (e.g. powders) in an encapsulant having apertures therein, vacuum-prepared gettering surfaces, and/or tube getters may be used. Passive pumping component(s) 150 may also be configured to tailor emissivity and/or conductivity to improve heating. For example, the inner surface of wall 110 vacuum cell 101 may include low emissivity region(s) configured to direct radiation toward the getter material. The inner surfaces of walls 110 may include localized heating regions thermally coupled with passive pumping components 150 (e.g. the regions having topography). In some embodiments, passive pumping components 150 include a barrier coating on at least a portion of the getter material.

In some embodiments, a reflector may be included in vacuum chamber 130 as part of passive pumping component(s) 150. Such a reflector may be used to redirect light used to form structures in getter material. For example, in some embodiments, walls 110 and/or 120 may be formed of a getter material such as Ti. Some or all of the inner surface of walls 110 and/or 120 may be patterned to have a topography including structures therein. These structures may form all or part of passive pumping component(s) 150. The integrated reflector incorporated into vacuum chamber 130 may allow optical access to the region of walls 110 and/or 120 to be patterned. For example, a laser may be used to pattern the structures in walls 110 and/or 120 via ultrafast surface modification. For regions that are not readily optically accessible, the integrated reflector may be used. The laser may be aimed at the reflector, which reflects the laser light onto the region to be patterned. As a result, large regions of walls 110 and/or 120 may be patterned more easily. Further, a coating window need not be used for ultrafast beam entry. The laser beam used may be large while entering a window, but be focused by the reflector onto target surfaces. In some embodiments, the structures 150 patterned may have heights and/or widths not exceeding ten microns. In some embodiments, the heights and/or widths do not exceed one micron. The heights and/or widths may be not more than one hundred nanometers. In some embodiments, the heights and/or widths may be not more than fifty nanometers. Other sizes are possible. Such structures 150 increase the surface area of the gettering material, which improves the ability of the gettering materials to reduce the pressure in vacuum chamber 130.

Figure 2A:
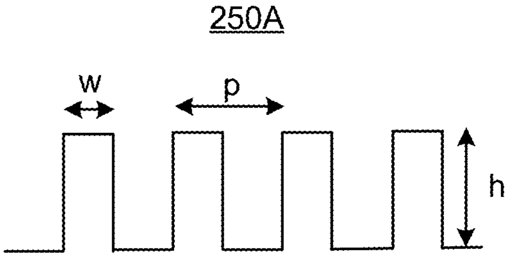
FIGS. 2A-2D depict embodiments of passive pumping components and viewports.
Figure 2B:
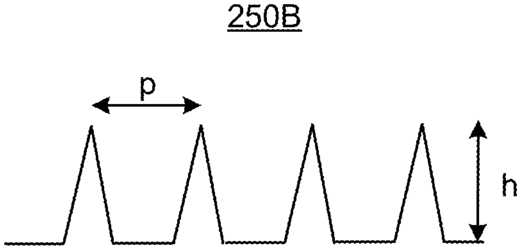

In some embodiments, the structures 150 created by ultrafast surface modification may be used to engineer emissivity for light control and/or absorption. Thus, such structures 150 may be formed in Ti walls 110, on other getters, other vacuum cell walls, structures within vacuum cell 101, mounts (not shown), and other materials. Such structures are considered part of passive pumping components 150, though may be formed in components that are not formed of getters. Nanostructured surfaces 150 may also reduce power wasted by enhancing the absorption of laser light. Thus, an improvement in heating for controlling various dispensers and getters, and/or ultra-high surface areas to enhance pumping speeds of evaporable or porous getters, may be achieved. In some embodiments, the modification may be used to provide apertures in encapsulant(s) for powder getters and/or other getters. In some embodiments, the surface modifications may be created, and then a getter coating, a non-evaporable getter (NEG) or other getter applied to surface(s) near ion trap 140. For example, FIGS. 2A and 2B depict passive pumping components 250A and 250B formed via ultrafast surface modification. For example, the structures of 250A and 250B may have a height h, and a pitch p in the ranges described above for structures formed (e.g. not more than a micro inch in some cases). Structures of 250A also have a width, w. The structures of 250A may be cylindrical or rectangular, while the structures of 250B may be conical. Other shapes are possible. Such passive pumping components 150, 250A, and/or 250B may improve pumping, achieve reduced pressures, and improve ion trap 140 performance and lifetime.

In addition, passive pumping components 150 may be configured to manage power requirements. For example, the surface emissivity of getters and near getters of passive pumping components 150 may be configured to reflect radiation back to the getter. In some embodiments, the surface of getters may be polished (e.g. via mechanical, chemical or other polishing). The surfaces may then be coated with one or more low emissivity coatings. For example, gold and/or protected gold (gold with a dielectric coating) may be used. In addition, blacking, such as small local heating spots with nanostructured surface modification and/or an oxide coating may be used for passive pumping components 150. Such regions improve laser sorption while reducing waste blackbody heat. Thus, heat wasted may be reduced, allowing for more efficient passive pumping by components 150 and more efficient heating with less power via a directed optical source such as a high power laser or LED.

Figure 2C:
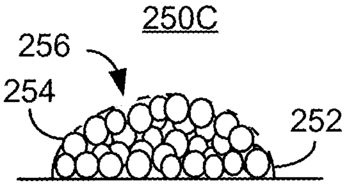

In some embodiments, passive pumping components 150 include getters formed of multiple pieces (e.g. powders). Such getters, particularly in powder form, may be encapsulated in a perforated sheet or mesh. For example, such a sheet or mesh may be formed of tantalum having perforations that are smaller than the diameter of the getter particles. For example, a laser perforated tantalum sheeting may be used. In some embodiments, the sheet may be polished, then masked and coated. The surface of the encapsulant may be modified with gold or other low emissivity surface modification. An ultrafast-laser or chemical etch may be used to blacken a local laser target spot and/or blacken the entire inside facing surface of the tantalum encapsulant to re-radiate back to the contained getter material. Thus, power management is improved. In some embodiments, depending on heat load and power requirements, part or all of the inward facing surface of the tantalum encapsulant may be polished and made highly reflective. This may increase response time to heat the contained getter but also reflects heat more efficiently back to said getter. For example, FIG. 2C depicts passive pumping component 250C formed from a powder getter 254 (of which only one piece is labeled) and an encapsulant 252 having apertures 256 therein. Encapsulant 252 may be a tantalum mesh and may have surface modifications, such as low emissivity region(s) and/or high reflectivity inner regions. Thus, passive pumping components 250C may more efficiently reduce the pressure in vacuum chamber 130.

In some embodiments, passive pumping components 150 include tube getters. The tube getter includes getter material(s) and a reaction resistant material enclosing a portion of the getter material(s). Such passive pumping components 150 include getters formed in a tube-shape with a coating covering at least a portion of the getters. The coating has a controlled emissivity and insulation. In some embodiments, the tubes may be pre-formed and pre-polished or wet etched. The material of the tubes may be stainless steel, tantalum, glass, and/or other reaction resistant materials. If glass tubing is utilized, the getter species may be melted or sorbed into the glass tube, protecting it from exposure while allowing optical access to heat the internals directly through the tube. The tube may also be broken free if the contained molten getter species forms a compound/fuses with the glass. In such a case, a passivation/encapsulation layer may be formed at the interface. Thus, a pure or nearly pure alkali/alkaline earth and/or other getter material may be encapsulated and passivated from exposure to air with minimal wasted volume. Thus, handling and installation is facilitated. Ablative lasers may be used to puncture, evaporate, ablate, fracture, or otherwise break the seal formed by the species-glass interface. Electrical heating elements may also be placed into contact to melt, damage, or otherwise open the encapsulating glassy shell. Mechanical means of breaking, puncturing, cracking, or otherwise opening the seal may also be employed.

Although described in the context of getters, tube getters, surface treatments, and encapsulants and other techniques described for passive pumping components 150 may be used for other dispensers. For example, the techniques described herein may be used to configure the encapsulant of dispensers (e.g. by forming perforations, providing coatings and/or tailoring the reflectivity and/or emissivity of the encapsulant) and/or to form tube dispensers (e.g. by forming the material to be dispensed in a glass tube and using electrical heating elements to melt, damage or otherwise open the glass shell). Such dispensers may be used for ion traps, cold atoms, and/or other components 140 used in vacuum chamber 130. Thus, such components 140 may be considered to include dispensers of other materials usable in vacuum cell 130 and which may be provided and/or used in conjunction with the techniques described in the context of passive pumping components 150.

Figure 2D:
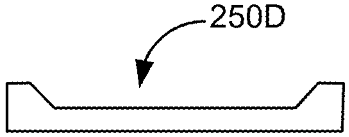

In some embodiments, passive pumping components 150 include one or more vacuum-prepared gettering surfaces. A vacuum prepared gettering surface is one which is exposed without subsequent exposure to ambient. For example, an argon gun, reactive ion etch, or other process in a vacuum or surface science chamber may be used to remove at least a monolayer from a getter. In some embodiments, walls 110 of vacuum chamber 101 may be formed of Ti. Before assembly with ion trap 140, the argon gun or other etch process may be used to remove the top (e.g. passivated) layer(s) of walls 110. The underlying Ti is exposed, providing a vacuum-prepared gettering surface. For example, FIG. 2D depicts passive pumping component 250D, a freshly exposed surface of a getter material, such as Ti and/or Zr. This vacuum-prepared gettering surface may be achieved without evaporating or otherwise depositing additional Ti (or other getter(s)), which may adversely affect other components in vacuum system 100.

Viewport 160 hermetically seals aperture 112 in walls 110 and provides optical access to vacuum chamber 130. In some embodiments, viewport 160 is configured to reduce helium permeation and/or reduce birefringence (e.g., below that of sapphire). For example, viewport 160 may be a laminated structure in which the laminations are configured to reduce the birefringence. Viewport 160 may also be formed of other glasses having reduced birefringence while maintaining reduced helium permeation. In some embodiments, viewport 160 is configured to manage stress (e.g. due to bonding to walls 110). Viewport 160 may also have coatings to tailor the properties of vacuum chamber 130. For example, viewport 160 may have AR coating(s) to reduce reflection, conductive coatings to reduce charge buildup, HR or hot mirror coatings to reflect blackbody radiation, other optical coating(s), permeation barrier coating(s) and/or other coatings or structures to tailor the properties of viewport 160.

In some embodiments, viewport 160 is attached to vacuum cell 101 such that viewport 160 is fused to walls 110 of vacuum cell 101. Stated differently, viewport 160 is directly bonded to walls 110, which may be Ti. In such embodiments, the viewport has an average surface roughness of not more than two micro inches. The viewport may have at least one of a conductive coating, a barrier coating, or a helium permeation coating. In some embodiments, the viewport includes multiple regions or layers of different birefringences configured to reduce the total birefringence of the viewport. Thus, the viewport may include a birefringent region having a particular birefringence and at least one additional region configured to reduce the total birefringence of the viewport to be less than the particular birefringence. The viewport may have a surface corresponding to the wall of the vacuum chamber. The surface may include surface modifications and/or a coating configured to control a reflectivity and/or a conductivity of the surface.

Viewport 160 may also be configured to reduce helium migration into vacuum chamber 130 while improving optical access. For example, low helium permeable materials and/or barrier coatings that are resistant to helium permeation may be used for viewport 160. For example, glasses that may be used for viewport 160 are chosen to have coefficient(s) of thermal expansion (CTEs) matching that of walls 110 (e.g. titanium) as closely as possible over the operational temperature ranges of vacuum chamber 130. In some embodiments, the operational temperature range(s) may include 0° C.-300° C., <5 Kelvin-300 Kelvin, and <5 Kelvin −300° C. (573 Kelvin). Such glasses have CTE's in the 0-300° C. range from at least 7 parts per million (ppm) to 11 ppm. For example, viewport 160 may include or consist of aluminosilicates such as corning 17xx series glasses, boro-aluminosilicates, lead glasses, and other glasses or glass composites such as EagleXG, AS87, Gorilla, sodalime, xensation, dragontrail, and/or B270. Barrier coatings used for viewport 160 may include graphene (e.g. a single layer monocrystalline or multilayer with flaws), alumina, sapphire, Nitrides, high density oxides, and/or thin metals. Such barrier coatings may be applied over the entire surface viewport 160 or applied after viewport 160 is affixed to walls 110. Thus, helium permeation through viewport 160 may be mitigated.

In some embodiments, ultrafast laser bonding may be used to fuse glasses forming viewport 160 to pre-polished titanium frames or rings or may be brazed to eutectic regions. Viewport 160 may be fused to the same material as walls 110 or directly to walls. In either case, viewport 160 may be considered to be fused to vacuum cell 101. Such bonding may be achieved by using Newton rings (i.e. interference fringes) in order to ensure that even pressure is applied during bonding. In some embodiments, some or all surfaces of viewport 160 may be diamond turned or computer numerical control (CNC) polished. In some embodiments, viewport 160 may be polished mechanically, chemically, fluidically or by some combination to enable sufficiently conformal surfaces for bonding or fusion. In some embodiments, the average surface roughness of viewport 160 is less than eight microinches. In some embodiments, the average surface roughness is less than five microinches. The average surface roughness may be less than four microinches. The average surface roughness is less than two microinches. In some embodiments, the average surface roughness is not more than one microinch. Such surface roughnesses allow for improved bonding between viewport and materials such as titanium.

In some embodiments, viewport 160 may be coated with indium tin oxide (ITO) or another conductor. Viewport 160 may include glasses having titanium vias or other via-arrayed glasses. For example, viewport 160 may include glass-silicon monolithic structural feedthrough glass. Such glasses may facilitate formation of field plates for field control within vacuum chamber 130, electrical feedthroughs for voltage and current applications, or for generic or localized grounding. In some embodiments, zinc tin oxide (ZTO) or other conductive oxides or even thin metal coatings may be applied to viewport 160. Such coatings may be applied after at least one step of the brazing/fusion from the glass to metal is complete to create a continuous ground plane from the metal perimeter across the transparent insulative surface. Coatings may also be sandwiched between the glass, sapphire, or ceramic layer(s) of viewport 160 and the metal frame to affect the continuous electrical connection through the fusion/bonding/soldering/eutectic/TLP interface.

In some embodiments, ultrafast or random antireflective (RAR) surface modifications for antireflective (AR) like coatings may be applied to the inside and/or outside surface of viewport 160 or other components. In some embodiments, coatings can be provided to function as AR coatings, high reflective (HR) coatings, conductive coatings, barrier coatings, and/or perform other functions. Further, such coatings may be provided over the entire surface of viewport 160, locally or portions of viewport 160, or patterned on viewport 160 (e.g. for circuit traces). Ultrafast modification of inherently conductive or conductive coated surfaces may be utilized to effectively cut traces into or separate conduction paths especially through bonded interfaces. Thus a single planar coated glass surface with ITO may be bonded (e.g. via anodic, contact, TLP, laser fusion, and/or other bonding process) to other glasses or other materials affecting a hermetic seal. Through the transparent glass of viewport 160, ultrafast laser modification of the conductive layer may be affected to turn a single sheet into multiple isolated electrodes, to write circuit traces, form field coils, and/or form other electrical circuits. Multiple layers may further be "written" independently or in sequence to affect multi-layered field plates or circuit traces or coils. Thus, the function of viewport 160 may be enhanced.

In some embodiments, viewport 160 includes material(s) that exhibit lower birefringence and or stress-induced birefringence than sapphire. In some embodiments, such materials may be laminated or otherwise combined to reduce or eliminate birefringence or stress-induced birefringence (due to CTE mismatch and or differential vacuum-atmospheric pressure). In some embodiments, birefringence cancellation may be achieved for viewport 160 by orthogonally aligning inherently birefringent material primary axes and/or by applying engineered coatings or laminates to cancel birefringence. Thus, viewport 160 may not only provide optical access to ion trap 140 and vacuum chamber 130, but also enhance the functioning of vacuum system 100.

Ion pump 170 may be used to maintain the vacuum in vacuum chamber 130 for longer times. In some embodiments, ion pump 170 is configured to improve operation at very low pressures. For example, ion pump 170 includes a cathode and an anode. At least a portion of the cathode surface may be patterned to have a cathode topography including a plurality of surface structures. For example, the surface of the cathode and/or inside of ion pump 170 may be formed or treated (e.g. laser blackened, RAR etch, nanostructure formed) to increase the pumping surface area for sputtering/trapping. Ribs may be provided in the inner surface of ion pump 170 to further increase surface area for improved pumping speed. In some embodiments, a spring or close fit wire mesh, or thin cylinder with high surface area features and/or slits may be provided. For example, slits may be provided on the anode and/or cathode of ion pump 170 improving vacuum conductance through the pump. In some embodiments, surfaces exposed to incident ion impacts at grazing angles may be polished, coated, passivated and or nanostructured to affect the angle of reflection, sputter probability, or other interaction with surfaces by the species ionized by ion pump 170. Slits or trenches or other high aspect ratio or angled features may be etched, printed, grown, or installed within ion pump 170 to change the angle of incidence of ions or electrons to facilitate pumping. The cathode and/or anode of ion pump 170 may include a shielded cathode, a sub-cathode (e.g. an electrode that may have a potential that is positive or negative relative to the cathode or anode), and/or field emitter (e.g. an array of electron emitters) topography.

Ion pump 170 may also include electron source(s) configured to inject electrons into the ion pump. For example, Spindt emitter(s) may be provided into, onto, or behind features of the cathode, anode or other pump and cavity features. Such emitters inject electrons directly into the penning cloud to improve stability of ion pump 170. Such emitters may be mounted to use features of ion pump 170 to shadow mask sputtering to prevent titanium sputter from shorting out or coating the emitters. Emitters may also be thin hot-filament wires run via electric or optical heating. Emitters may be coated to improve electron emissions. For example, thorium or other low work function material(s) such as those used in ion gauges may be employed. Emitters may be utilized in a magnetless ion pump configuration where current densities from direct emissions are sufficient to obviate the need for the large magnetic fields required to sustain a penning trap.

In some embodiments, laser operated titanium/barium getters or NEG's may be provided in or near ion pump 170 to kickstart or assist ion pump 170 in its stability or for general pumping purposes. For example, laser perforated titanium, tantalum, stainless, tungsten or other sheets containing heat/thermal decomposition crystals, elements, or compounds that yield $CO_2$, nitrogen, CO or other passively getterable gases may be provided. Such gases may be used for kickstarting ion pump 170 with getterable gases. Thus, ion pump 170 may be better able to ionize and pump to maintain stable operation even at XHV pressures. Such sources are coupled with getters/pumps between ion pump 170 and ion trap 140 or other components within vacuum chamber 130. This may reduce the background gas interference from the intentionally injected contaminants used to keep the ion pump operating efficiently. This efficient and stable operation may be of aid in ensuring helium is adequately pumped if the materials chosen for the vacuum chamber prove permeable to helium and/or helium becomes a contaminant gas.

Pinch off tube 180 may be coupled to a pump (not shown) and used to evacuate vacuum chamber 130. Pinch off tube 180 may be a copper or other pressure weldable material used as a vacuum pumpout and sealing stem/port. Such a tube may be laser bonded, transient liquid phase (TLP) bonded, brazed, soldered, welded, or otherwise affixed to vacuum cell 101. For example, pinch off tube 180 may be affixed to a port in the titanium structure of walls 110 or 120. Pinch off tube 180 may be brazed, laser bonded, fused, or otherwise hermetically sealed to a doughnut-like window material (e.g. sapphire, glass, and/or analogous materials) and installed by the same process as laser windows. Pinch off tube 180 may be glass, and thus be a glass tipoff tube. Pinch off tube 180 may also be of a less pressure weldable material such as tantalum or other soft metals but be electroplated, or otherwise lined with a softer more easily pressure-weldable material (e.g. indium, gold, silver, copper, etc.) to facilitate a pressure welded seal after vacuum processing. The combination of materials may be chosen to form a eutectic or be chemically compatible with a post seal technique to strengthen the seal seam. Thus, pinch off tube 180 may be configured to facilitate cold welding.

Thus, vacuum system 100 includes various features to improve functioning of vacuum cell 101 and/or component 140. Various combinations of features described in the context of system 100 may be provided.

FIGS. 3A-3D depict an embodiment of compact vacuum cell 301 that may be usable in a vacuum system such as vacuum system 100. Vacuum cell 301 includes a first portion 320 having walls forming vacuum chamber 330 and passive pumping components 350, ion trap 340 residing on second portion 310, and viewport 360 that are analogous to walls 120, vacuum chamber 130, passive pumping components 150, ion trap 140, walls 110, and viewport 160, respectively. First portion 320 is a Ti cell having apertures in the walls for additional optical access ports 324 (of which only one is labeled), and viewport 360. Because portion 320 is formed of Ti, passive pumping components 350, such as structures 250A or 250B, may be formed on the inner surface of portion 320. Further, Ti portion 320 limits helium permeation through the walls. In addition, viewport 360 and additional optical access ports 324 may be configured in an analogous manner to viewport 160. Thus, helium permeation and/or birefringence may be reduced. Further, additional optical access ports 324 and/or viewport 360 may have one or more coatings configured to tailor their reflectivity, emissivity, conductivity, and/or other properties. Optical access ports 324 and/or viewport 360 may also be sealed to apertures in Ti piece 320 in a manner analogous to that described for viewport 160.

Piece 310 is a ceramic pin-grid array (CPGA) in the embodiment shown. In another embodiment, CPGA 310 may be replaced by a machined substrate with welded feedthroughs, a photonics integrated circuit (PIC), or by another analogous component. CPGA 310 allows for electrical connection to be provided to ion trap 340. CPGA 310 includes ring frame 390 that may be machined from the substrate or attached to the substate. Ring frame 390 fits into mating groove (not shown) in Ti piece 320 where the vacuum seal is made at the interface of each piece. Ring frame 390 and the mating groove include materials for bonding pieces 310 and 320, forming a hermetic seal. For example, ring frame 390 may include gold, while the groove in piece 320 may include tin. Thus, a bond may be formed by aligning placing pieces 310 and 320 in contact and heating. In some embodiments, the bond formed has a debonding temperature that is higher than the bonding temperature. Further, bond 370 may be a metal alloy bond that is more robust and permanent. Thus, Ti piece 320 and CPGA 310 may be hermetically sealed. In some embodiments.

Figure 3A:
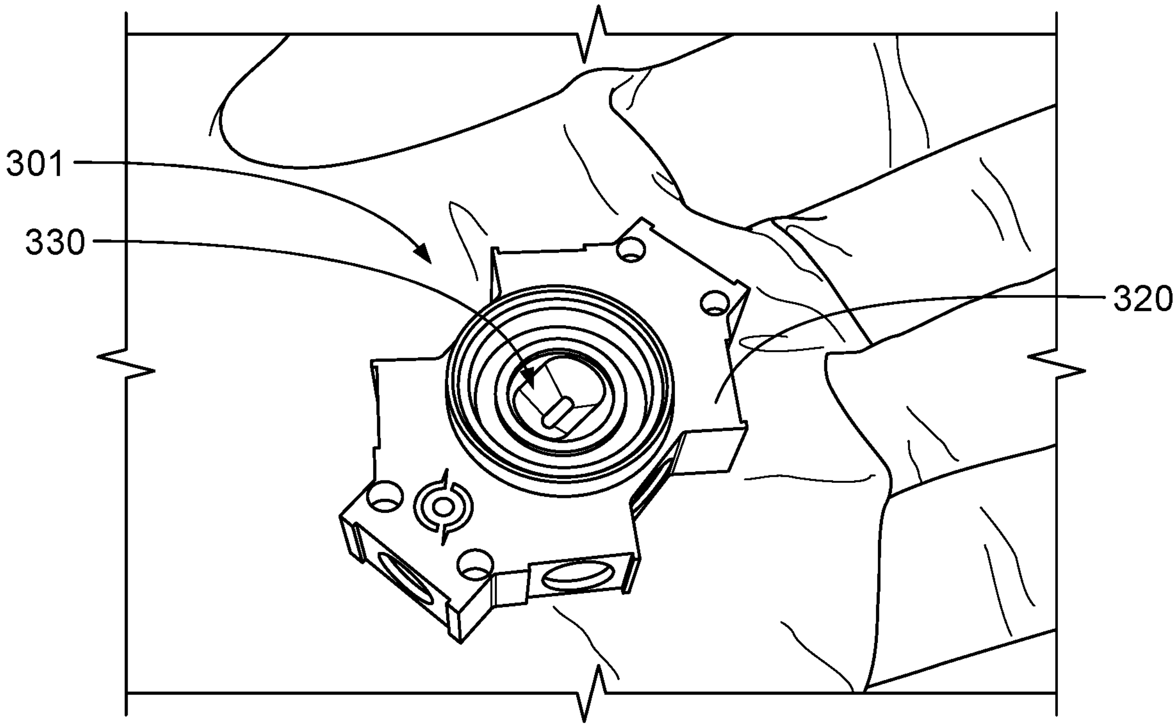
FIGS. 3A-3D depict an embodiment of a compact vacuum cell.
Figure 3B:
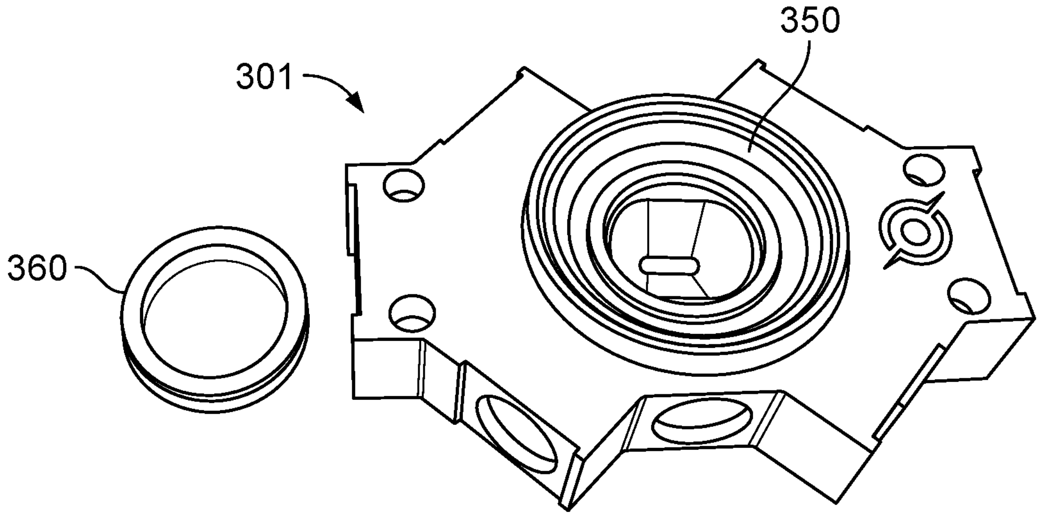
Figure 3C:
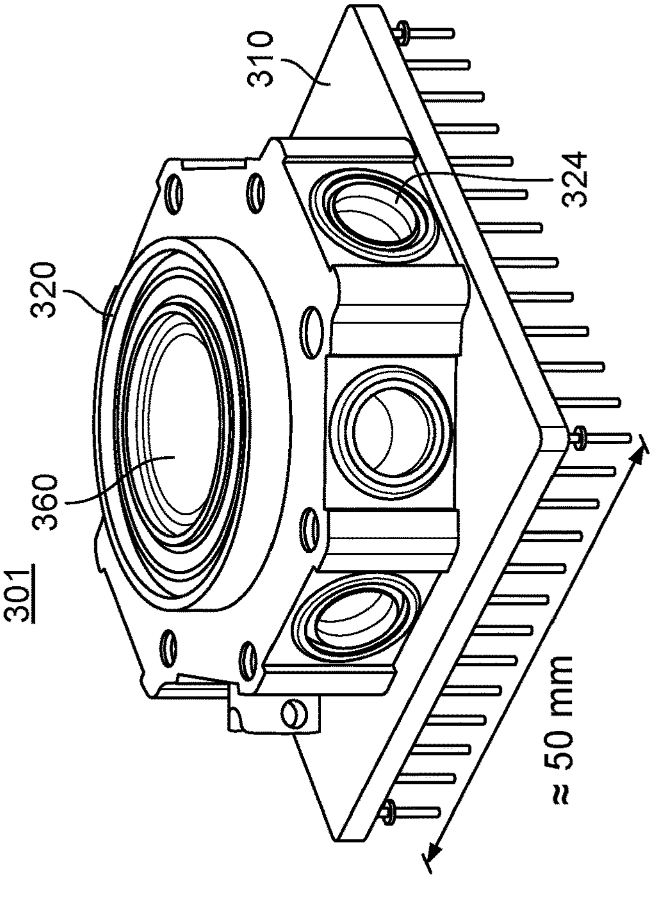
Figure 3D:
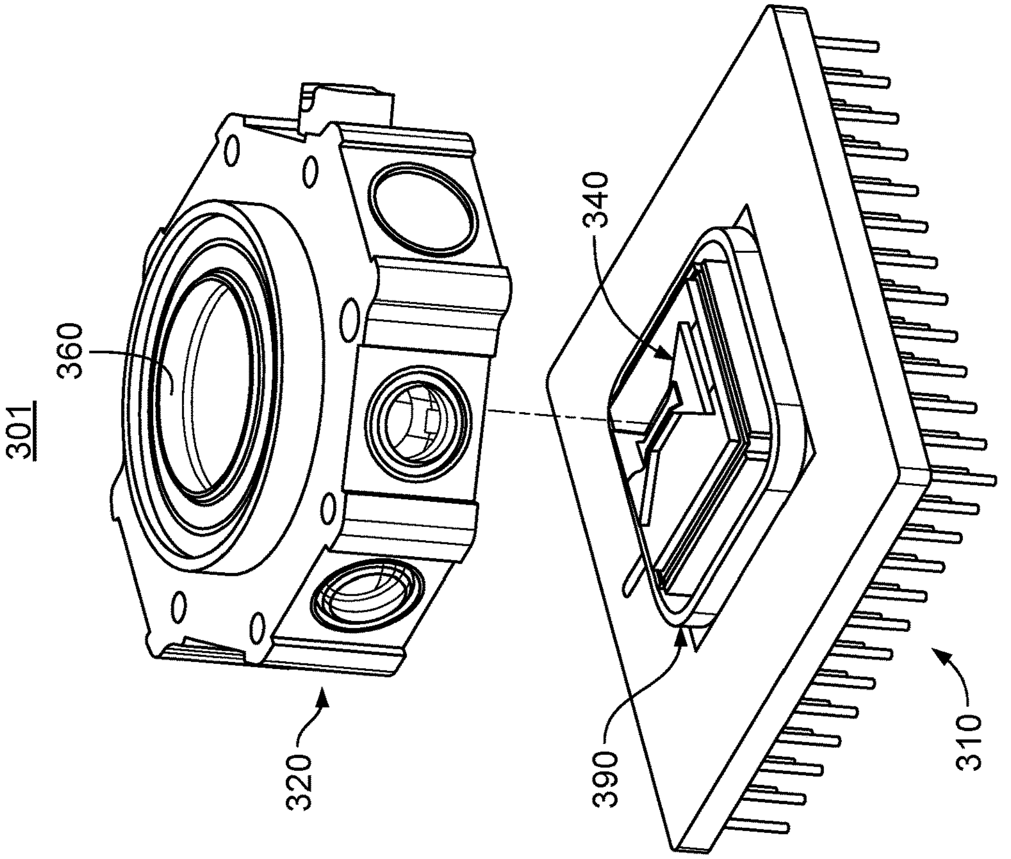

Thus, vacuum cell 301 provides electrical access via CPGA 310 and optical access via viewport 360 and additional optical access ports 324. Vacuum cell 301 is also capable of reaching and maintaining the low pressures described in the context of vacuum system 100. This may be achieved in part via the reduction in helium permeation and additional gettering provided by passive pumping components 350. Moreover, vacuum cell 301 is compact. As indicated in FIG. 3C, vacuum cell 301 may be on the order of fifty millimeters wide. Consequently, UHV or XHV pressures may be reached and maintained in a very compact form factor.

Figure 4:
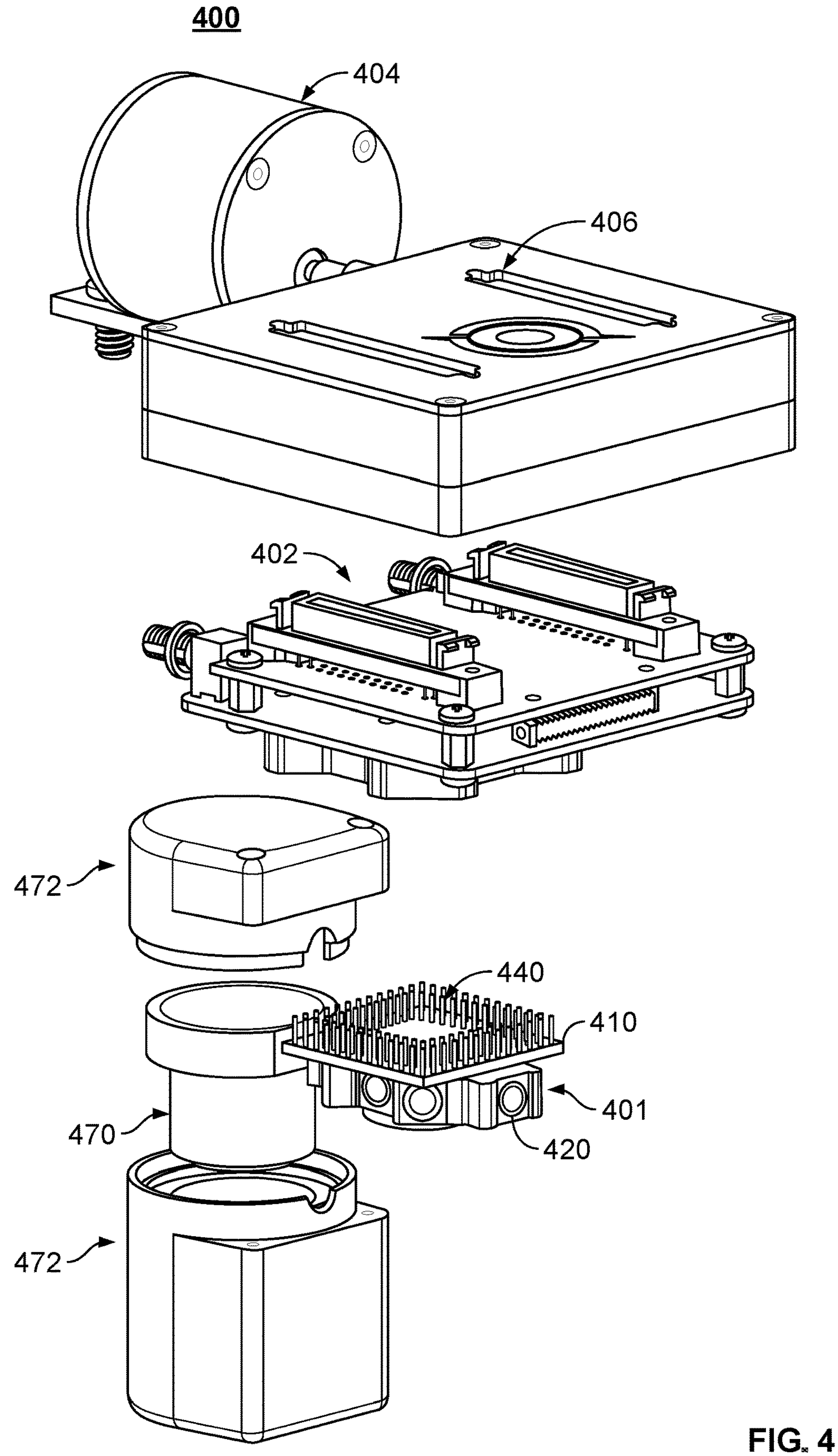
FIG. 4 depicts an exploded view of an embodiment of a vacuum system including a compact vacuum cell having an ion trap.

FIG. 4 depicts an exploded view of an embodiment of vacuum system 400 including compact vacuum cell 401. Vacuum system 400 includes vacuum cell 401 having ion trap 440 and ion pump 470 that are analogous to vacuum cells 101 and 301, ion traps 140 and 340, and ion pump 170. Vacuum system 400 also includes electrical assembly 402, helical resonator 404, and electromagnetic interference (EMI) shield box 406. In other embodiments, other and/or additional components may be included.

Vacuum cell 401 includes CPGA 410 and Ti piece 420 that are analogous to CPGA 310 and Ti piece 320. Although not labeled, vacuum cell 401 includes a vacuum chamber, viewport, additional optical access ports and, in some embodiments, passive pumping components that are analogous to vacuum chambers 130 and 330, viewport 130 and 330, additional optical access ports 324, and passive pumping components 150 and 350, respectively. Thus, vacuum cell 401 may be capable of reaching and maintaining pressures described with respect to vacuum cells 101 and 301.

Ion pump 470 is analogous to ion pump 170 and includes shields 472. Although not shown, ion pump 470 may include structures such as electron emitters (e.g. Spindt emitters), getters, slits, nanostructures, and/or other features described in the context of ion pump 170. Thus, ion pump 470 may have improved functioning at low pressures.

Thus, vacuum system 400 provides electrical access to the vacuum chamber housing ion trap 440 via CPGA 410 and optical access via a viewport and additional optical access ports. Vacuum cell 401 is also capable of reaching and maintaining the low pressures described in the context of vacuum system 100. This may be achieved in part via the reduction in helium permeation and additional gettering provided by passive pumping components analogous to passive pumping components 150 and/or 350. Ion pump 470 may provide improved pumping at very low pressures. Moreover, vacuum cell 401 and vacuum system 400 are compact. Consequently, UHV or XHV pressures may be reached and maintained in a very compact form factor.

Figure 5:
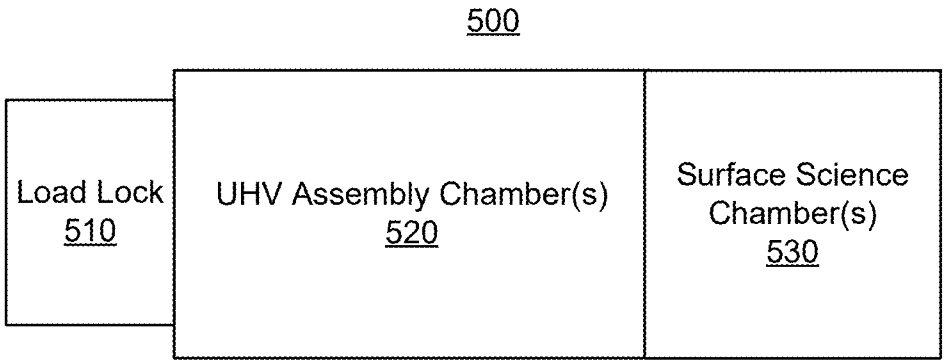
FIG. 5 depicts an embodiment of a system for fabricating a vacuum cell.

FIG. 5 depicts an embodiment of system 500 for fabricating a vacuum system, such as vacuum system 100 and/or 400. Although described in the context of vacuum cells 101, 301 and 401, system 500 may be used to fabricate other vacuum cells and/or other apparatus. For clarity, not all components of system 500 are shown.

System 500 includes load lock 510, UHV assembly chamber 520, and surface science chamber 530. In operation, components of a vacuum cell may be placed in load lock 510 and moved to UHV assembly chamber 520, which may then be evacuated. UHV surface science chamber 530 may include mechanisms for manipulating the components of the vacuum cell therein and performing operations, such as laser patterning, evaporation or other deposition of material(s), etching, oxidation and other operations used to prepare the interior surfaces of the vacuum chamber in the vacuum cell being formed. Thus, pieces of a vacuum cell may be separated and undergo processing in different chambers. For example, walls 120 or 320 of vacuum cells 101 and 301, respectively, may undergo patterning, removal of layers of getter material (e.g. Ti and/or Zr using an argon gun or RIE), and/or other processing in surface science chamber 530. However, ion trap 140 and/or 340 may be separated from such processing, for example remaining in UHV assembly chamber 520. Consequently, the desired fabrication can be accomplished without damaging other components of the vacuum cell. UHV assembly chamber 520 may also include heaters or other mechanisms for controlling temperature. Thus, portions of the vacuum cell may be assembled and bonded. Further, the final sealing of the vacuum cell may take place under UHV. Thus, the presence of bulky valves, pinch-offs, or high-throughput vacuum pumps in the final vacuum cell may be avoided. UHV assembly chamber 520 may also include mechanisms for testing the vacuum cell formed.

Thus, using system 500, vacuum system 100 and 400 and vacuum cells 101, 301, and 401 may be readily formed. Further, because components 101, 140, 150, 160, 170, 180, 301, 340, 350, 360, 370, 401, 440, and/or 470 have the characteristics described herein, vacuum systems 100 and/or 300 may have improved performance. Thus, fabrication and operation of vacuum cells and vacuum systems may be improved.

Figure 6:
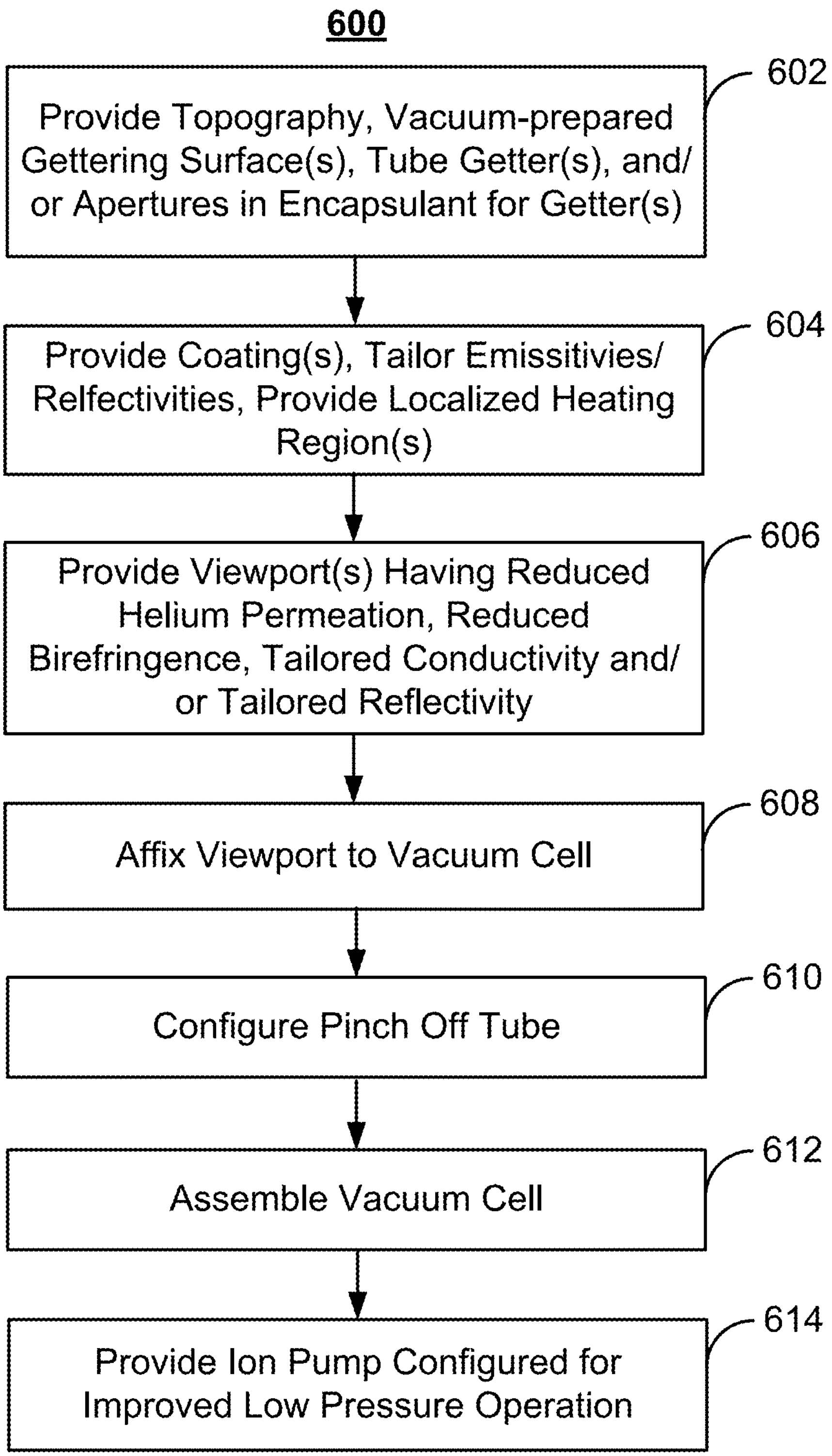
FIG. 6 is a flow chart depicting an embodiment of a method for fabricating a vacuum system.

FIG. 6 is a flow chart illustrating an embodiment of process 600 for fabricating a vacuum system. For simplicity, not all steps are shown. Further, some portions of method 600 may be carried out in system 500. Thus, the processes described may be carried out without exposing the vacuum cell to ambient (e.g. outside of UHV assembly chamber(s) 520 and surface science chamber(s) 530). Thus, method 600 is described without reference to processes related to loading portions of the vacuum system into system 500. Further, although described in a particular order, in some embodiments, processes in method 600 may be performed in another order. Further, some processes of method 600 may be omitted in some embodiments.

After formation of a portion of the vacuum cell walls, such as Ti piece 320, passive gettering components are provided, at 602. For example, the surface topography of the walls or other structure(s) may be defined, vacuum-prepared gettering surface(s) exposed, tube getter(s) may be placed, and apertures in encapsulants for powder getters are provided. Additional processes for passive pumping components may also be completed, at 604. For example, coatings for getters may be provided, emissitivities of regions may be tailored, reflectivities of desired regions may be configured, and/or regions that provide localized heating may be formed. Thus, 602 and 604 provide some or all of passive pumping components 150 that are desired to be included in the vacuum system being fabricated.

Viewports having the desired properties, such as reduced helium permeation, reduced birefringence, tailored conductivity and/or reflectivity are provided, at 606. The viewport is affixed to the vacuum cell, at 608. In some embodiments, the viewport is fused to the vacuum cell. In some embodiments, 606 and/or 608 are performed prior to 602 and 604. A pinch off tube may configured as desired, at 610. For example, an indium coating may be provided and the pinch off tube affixed to the vacuum cell. Remaining portions of the vacuum cell are assembled under vacuum, at 612. The ion pump may be provided, at 614. In particular, features such as the topography of the cathode and/or anode, the additional electron source(s), and/or getters may be provided.

For example, one or more passive pumping components 150 may be provided and configured for improved operation at 604 and 606. At 602, surface(s) of Ti piece 320 may be subject to ultrafast surface modifications to form structures that may increase the surface area of Ti (i.e. increase the surface area of the getter) and/or tailor the reflectivity of the walls. The desired coatings may be provided on the getter(s) at 604. Viewport 160 and/or 360 may be provided, at 606. For example, a glass having reduced helium permeation or a laminated sapphire (birefringent) structure having reduced birefringence may be provided. Further, a surface of viewport 160 and/or 360 may be coated and/or patterned to provide the desired conductivity (or electrical circuit pattern), permeation barrier, and/or reflectivity. Viewport 160 may then be affixed to vacuum cell 101, at 608. In some embodiments, the viewport is fused directly to the vacuum cell. In such embodiments, the surface roughness of the viewport is desired to be in the ranges described for viewport 160. Pinch off tube 180 may be configured at 610 and assembly of vacuum cell 101 completed under UHV, at 612. Ion pump 170 may be provided and used in conjunction with vacuum cell 101, at 614.

Thus, using method 600, vacuum system 100 and 400 and vacuum cells 101, 301, and 401 may be readily formed. Further, because components 101, 140, 150, 160, 170, 180, 301, 340, 350, 360, 370, 401, 440, and/or 470 have the characteristics described herein, vacuum systems 100 and/or 300 may have improved performance. Thus, fabrication and operation of vacuum cells and vacuum systems may be improved.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A vacuum system, comprising:

a vacuum cell including a plurality of walls having an inner surface forming at least a portion of a vacuum chamber, at least a portion of the inner surface having a topography including a plurality of structures thereon, the plurality of structures including a getter material;

an ion trap within the vacuum chamber;

at least one additional getter including a plurality of getter pieces; and an encapsulant configured to retain the at least one additional getter and having a plurality of perforations therein, the getter pieces being larger than the plurality of perforations.

2. The vacuum system of claim 1, further comprising:

an integrated reflector in the vacuum chamber, the integrated reflector configured to provide optical access to the at least the portion of the inner surface having the topography.

3. The vacuum system of claim 1, wherein the inner surface further includes:

a low emissivity region configured to direct radiation toward at least one of the getter material or a dispenser material;

a localized heating region thermally coupled with the at least the portion of the inner surface; and/or a barrier coating on at least a portion of the at least one of the getter material or a dispenser material.

4. The vacuum system of claim 1, further comprising:

at least one of a tube getter or a tube dispenser residing in the vacuum chamber, the at least one of the tube getter or the tube dispenser including at least one of an additional getter material or a dispenser material and a reaction resistant material enclosing a portion of the at least one of the additional getter material or the dispenser material.

5. The vacuum system of claim 4, wherein the reaction resistant material includes at least one of stainless steel, tantalum, or glass.

6. The vacuum system of claim 1, wherein a wall of the plurality of walls of the vacuum cell includes an aperture therein, the vacuum system further comprising:

a viewport coupled to the vacuum cell and hermetically sealing the aperture, wherein:

the viewport is attached to the vacuum cell such that the viewport is fused to the vacuum cell;

the viewport has at least one of a conductive coating, an optical coating, or a permeation barrier coating;

the viewport includes a plurality of regions including a birefringent region having a particular birefringence and at least one additional region configured to reduce a total birefringence of the viewport to be less than the particular birefringence;

the viewport has an average surface roughness of not more than two micro inches; and/or the viewport has a surface corresponding to the wall, the surface including at least one of a plurality of surface modifications or a coating, the at least one of a plurality of surface modifications or a coating configured to control at least one of a reflectivity or a conductivity of the surface.

7. The vacuum system of claim 1, further comprising:

an ion pump including a cathode having a cathode surface and an anode having an anode surface, at least a portion of at least one of the cathode surface or the anode surface having a shielded cathode, sub-cathode, or field emitter topography including a plurality of surface structures; and at least one electron source configured to inject electrons into the ion pump.

8. The vacuum system of claim 1, further comprising:

a pinch off tube configured to be coupled with a vacuum pump, the pinch off tube having an indium coated interior surface.

9. The vacuum system of claim 1, further comprising:

at least one getter material having a vacuum-prepared gettering surface in the vacuum chamber.

10. The vacuum system of claim 1, wherein the vacuum cell has a maximum dimension of not more than four inches and is configured to achieve a vacuum of less than $10^{-10}$ Torr.

11. The vacuum system of claim 1, wherein the vacuum chamber has a volume of not more than four cubic centimeters and is configured to achieve an initial vacuum of less than $10^{-9}$ Torr.

12. A vacuum cell, comprising:

a first portion of the vacuum cell including a getter material and having an aperture therein, the first portion having an inner surface forming a first portion of a vacuum chamber, at least a portion of the inner surface having a topography including a plurality of structures formed thereon, the plurality of structures including a first portion of the getter material, a second portion of the getter material having a vacuum-prepared gettering surface;

a viewport configured to provide optical access to the vacuum chamber and hermetically sealing the aperture, being fused to the first portion of the vacuum cell, wherein the viewport is bonded to the first portion such that the viewport is fused to the vacuum cell, the viewport having an average surface roughness of not more than 1.5 micro inches; and a second portion of the vacuum cell forming a second portion of the vacuum chamber, the second portion including an ion trap and a substrate hermetically sealed to the first portion of the vacuum cell.

13. A method for providing a vacuum system, comprising:

providing a vacuum cell including a plurality of walls having an inner surface forming at least a portion of a vacuum chamber, the providing the vacuum cell further including forming a topography including a plurality of structures in at least a portion of the inner surface, the plurality of structures including a getter material;

providing an ion trap configured to reside within the vacuum chamber;

providing, in the vacuum chamber, at least one additional getter including a plurality of getter pieces; and providing an encapsulant configured to retain the at least one additional getter and having a plurality of perforations therein, the getter pieces being larger than each of the plurality of perforations.

14. The method of claim 13, wherein the providing the vacuum cell further includes:

forming a low emissivity region configured to direct radiation toward the getter material; and/or providing a localized heating region thermally coupled with the at least the portion of the inner surface.

15. The method of claim 13, further comprising:

providing a barrier coating on at least a portion of the getter material.

16. The method of claim 13, further comprising:

providing at least one of a tube getter or a tube dispenser residing in the vacuum chamber, the at least one of the tube getter or tube dispenser including at least one of an additional getter material or a dispenser material and a reaction resistant material enclosing a portion of the at least one of the additional getter material or the dispenser material.

17. The method of claim 13, wherein a wall of the plurality of walls of the vacuum cell includes an aperture therein, the method further comprising:

providing a viewport coupled to the vacuum cell and hermetically sealing the aperture, wherein the providing the viewport includes:

attaching the viewport to the vacuum cell such that the viewport is fused to the vacuum cell;

providing at least one of a conductive coating, optical coating, or a permeation barrier coating on the viewport;

forming the viewport from a plurality of regions including a birefringent region having a particular birefringence and at least one additional region configured to reduce a total birefringence of the viewport to be less than the particular birefringence;

polishing at least a portion of the viewport to an average surface roughness of not more than two micro inches; and/or configuring a surface of the viewport corresponding to the wall such that the surface includes at least one of a plurality of surface modifications or a coating configured to control at least one of a reflectivity or a conductivity of the surface.

18. The method of claim 13, further comprising:

providing an ion pump including a cathode having a cathode surface and an anode having an anode surface, at least a portion of at least one of the cathode surface or the anode surface having a particular topography including a plurality of surface structures; and providing at least one electron source configured to inject electrons into the ion pump.

* * * * *